United States Patent

Steele

Patent Number: 5,952,542
Date of Patent: Sep. 14, 1999

[54] METHOD OF OXIDATION

[75] Inventor: David Frame Steele, Dunnet, Caithness, United Kingdom

[73] Assignee: AEA Technology, Dicot, United Kingdom

[21] Appl. No.: 09/029,086

[22] PCT Filed: Oct. 3, 1996

[86] PCT No.: PCT/GB96/02422

§ 371 Date: Feb. 19, 1998

§ 102(e) Date: Feb. 19, 1998

[87] PCT Pub. No.: WO97/15356

PCT Pub. Date: May 1, 1997

[30] Foreign Application Priority Data

Oct. 21, 1995 [GB] United Kingdom ............... 9521609

[51] Int. Cl.$^6$ ....................................... C02F 1/46
[52] U.S. Cl. .................... 588/204; 205/687; 205/688; 205/703; 205/746; 205/747; 588/210; 588/227
[58] Field of Search ................... 588/204, 210, 588/227; 205/687, 688, 703, 746, 747

[56] References Cited

U.S. PATENT DOCUMENTS 4,752,364  6/1988  Dhooge ................................. 205/703
5,855,763  1/1999  Conlin et al. ......................... 205/688

*Primary Examiner*—Arun S. Phasge
*Attorney, Agent, or Firm*—William H. Holt

[57] ABSTRACT

Electrochemically regenerated $RuO_4$ (or corresponding oxides of Os, Ir, Rh) is used in the decomposition of matter, especially matter containing organic material. The method has particular advantage in dealing with compounds containing chlorine and, in a development, provides for the removal of heteroatoms N, Cl P, As, S, avoiding contamination with unoxidised organics and/or Ru (or Os, Ir, Rh as the case may be).

15 Claims, 2 Drawing Sheets

METHOD OF OXIDATION

This application is a 371 of PCT/GB96/02422 filed Oct. 3, 1996.

This invention relates to a method of oxidation and more particularly to a method of oxidation suitable for decomposing waste organic material and especially such waste organic material containing halogenated compounds.

Use of electrochemically regenerated Ag ions in the decomposition of organic waste matter is described in patent specification EP 0 297 738. Whilst that process is capable of use in the treatment of halogenated organic compounds, problems are created by the insolubility and consequent precipitation of resulting silver halides.

Use of an electrochemically regenerated higher valency oxide or salt of ruthenium, osmium, iridium, rhodium in the oxidative treatment of a substance such as polychlorinated biphenyl is described in patent specification GB 2 226 331.

The present invention is a development of GB 2 226 331, which development provides improvements in a number of respects in the method. Further, we have appreciated that the method has useful application in the destruction of halogenated organic compounds found in weapons materials and rocket fuels. The need to dispose of large stockpiles of such materials currently presents a major environmental problem. The presence in such materials of heteroatoms such as nitrogen, chlorine, phosphorus, arsenic and sulphur poses problems in the operation of the method of GB 2 226 331. It is an object of the present invention to overcome or ameliorate these problems.

According to the invention there is provided a method of oxidation of a substance by treatment with a metal oxide or salt the metal therof being in an initially higher valency state and reduced to a lower valency state during the oxidation reaction, the metal being selected from the group consisting of ruthenium, osmium, irridium and rhodium, wherein the metal oxide or salt after the oxidation reaction is continuously regenerated by means of an electrochemical cell including an anolyte comprising an aqueous solution containing a metal halide and the aforesaid metal oxide or salt, an aqueous catholyte and a cation exchange membrane separating the anolyte and catholyte, characterised in that, for the recovery of the ruthenium, osmium, iridium or rhodium and/or removal of heteroatoms such as nitrogen, chlorine, phosphorus, arsenic, or sulphur, feed of the substance for oxidation is stopped periodically or at the end of a batch treatment whilst operation of the electrochemical cell is continued until all of said metal in the cell which is to be recovered and which is in its lower valency state has been converted into its higher valency state and separated so that heteroatoms remaining are removable as a waste solution or recoverable by a separation process such as crystallisation or precipitation.

Where the metal is ruthenium, $RuO_4$ is readily separated by volatilisation and absorption in an alkaline solution after all $RuO_2$ in the cell to be recovered, either periodically or at the end of a batch treatment, has been electrochemically converted to $RuO_4$.

Preferably the metal halide in the anolyte is an alkali metal halide and preferably the chloride.

We have now found that it is better to operate with the anolyte in a neutral or slightly acid solution which is preferably buffered with an inorganic salt such as phosphate.

Preferably the catholyte comprises an aqueous alkali solution and tendency for the acidity of the anolyte to rise during operation with corresponding increase in alkilinity of the catholyte is counteracted by a controlled feed of some catholyte into the anolyte.

This controlled feed of catholyte into the anolyte is conveniently used to scrub chlorine gas evolving from the anolyte. The quantity of the controlled feed of catholyte into the anolyte used for scrubbing can be adjusted so as to ensure all evolving chlorine gas is scrubbed out but not all of the evolving carbon dioxide. The evolution of carbon dioxide can then be used as an indication that the process is working.

It is also possible to use part or all of the controlled feed of catholyte into the anolyte as a pre-treatment for the substance for oxidation so as to precipitate unwanted cations and/or cause partial hydrolysis of components of the said substance.

The substance to be oxidised may be added directly to the anolyte in the cell, with or without pre-treatment, and an electric current passed through the cell. Alternatively, the metal oxide or salt in the higher valency state thereof may be withdrawn from the anolyte and used to oxidise the substance outside the cell. In that case, the reduced metal salt or oxide is recycled to the anolyte in the cell for regeneration to the higher valency state.

BRIEF DESCRIPTION OF THE DRAWINGS

A specific construction of apparatus and method embodying the invention will now be described by way of example and with reference to the accompanying drawings, in which.

FIG. 1, labelled PRIOR ART, corresponds with the figure of GB 2 226 331 which is a diagrammatic representation of a system including an electrochemical cell for oxidative treatment of a substance, and.

FIG. 1 illustrates a suitable form of system 10 in which the method of the present invention can be practised.

Figure 1:
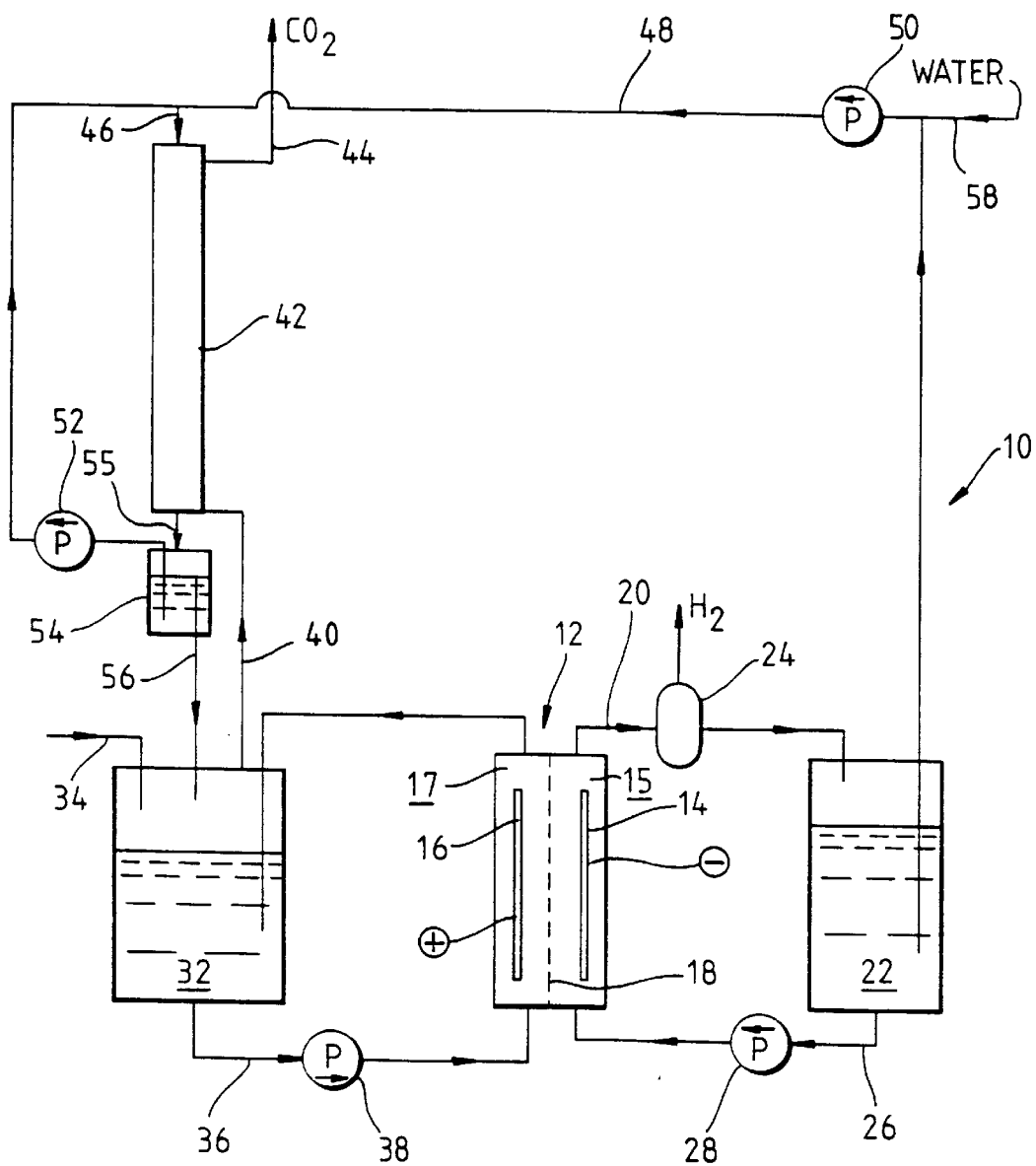

The system 10 comprises an electrochemical cell 12 having a stainless steel cathode 14 in a cathode compartment 15, a platinum anode 16 in an anode compartment 17, and an ion exchange membrane 18 separating the cathode compartment 15 and the anode compartment 17. The membrane 18 must be resistant to the oxidising conditions in the anolyte and the Nafion (sulphonated fluoropolymer) series of membranes, manufactured by Du Pont, have proven to be very suitable. The cathode compartment 15 is connected by a duct 20 to a catholyte reservoir 22, and a gas/liquid separator 24 in the duct 20 removes hydrogen from the catholyte. A return duct 26 from the reservoir 22 is connected to a pump 28 which is connected to the cathode compartment 15. An outlet duct 30 from the anode compartment 17 extends to an anolyte reservoir 32 which has an inlet 34 for the waste material. A return duct 36 from the anolyte reservoir 32 connects through a pump 38 to the anode compartment 17.

A gas vent 40 from the anolyte reservoir 32 connects to a scrubber column 42 with an outlet 44 for carbon dioxide and an inlet 46 from circulation duct 48. The circulation duct 48 extends from the catholyte reservoir 22, through a transfer pump 50. A duct 55 from the bottom of the scrubber column 42 feeds into a scrubber reservoir 54 which has a discharge pipe 56 positioned to maintain a pre-selected level of scrubbed liquid in the scrubber reservoir 54. Pump 52 provides for some recirculation of scrubbed liquid from reservoir 54 back through the scrubber column 42. A water feed inlet 58 is connected to the circulation duct 48 between the catholyte reservoir 22 and the transfer pump 50.

In operation, waste material is fed via inlet 34 into the anolyte reservoir 32 and circulated with anolyte through the anode compartment 17. Catholyte from the catholyte reservoir 22 is circulated through the cathode compartment 15. At the same time, a proportion of catholyte from the catholyte reservoir 22 is circulated through the circulation duct 48 by the transfer pump 50 and through inlet 46 into the top of the scrubber column 42, make-up water being injected through the feed inlet 58. Off-gases from the anolyte reservoir 32 are passed through the gas vent 40 into the scrubber column 42 and carbon dioxide escapes through the outlet 44. The circulating liquor discharges from the scrubber column 42 into the scrubber reservoir 54 and a constant overflow is maintained from the latter through the discharge pipe 56 into the anolyte reservoir 32.

The flow through the scrubber column 42 is determined by the feed rate from pump 50 of catholyte and make-up water together with recirculation effected by pump 52. This provides for control over the operation of the scrubber column 42 which has to be such as will accommodate reaction of the sodium hydroxide in the catholyte with carbon dioxide and remove all gaseous chlorine in the offgas, with a modest margin for safety.

A modification of the apparatus is possible by which the feed from pump 50 is directed into scrubber reservoir 54 instead of inlet 46 to the top of the scrubber column 42. The entire feed to the scrubber column 42 would then be provided and controlled by pump 52. Such an arrangement is advantageous if the sodium hydroxide concentration in the feed from duct 48 is higher than is desirable for the top of the scrubber column 42.

The system 10, operating with ruthenium as the metal, produces $RuO_4$ on a continuous basis for oxidation reactions in the cell 12 or in the anolyte reservoir 32.

As described in GB 2 226 331, the basic reactions involved are:

Halogen generated at the anode, demonstrated as $$2Cl^- \rightarrow Cl_2 + 2e^- \tag{1}$$

The chlorine reacts with OH ions or water in the anolyte to form OCl or HOCl (hypochlorite or hypochlorous acid; the reactions are pH dependent):

$$Cl_2 + 2OH^- \rightarrow OCl^- + Cl^- + H_2O \tag{2}$$

and $$Cl_2 + H_2O \rightarrow HOCl + H^+ + Cl^- $$

The hypochlorite/hypochlorous acid oxidises the metal salt or oxide, illustrated as $$RuO_2 + 2OCl^- \rightarrow RuO_4 + 2Cl^- \tag{3}$$

The $RuO_4$ oxidises the organic waste matter to carbon dioxide, water and the chloride ion, and is itself reduced to $RuO_2$. The $RuO_2$ and chloride ions from the organic waste material and those formed in reaction (3) are then re-oxidised as shown above in reactions (1), (2) and (3).

The current flowing through the cell is carried by $Na^+$ ions crossing the membrane, which is selectively permeable to cationic species. Some water molecules also cross the membrane in association with the $Na^+$ ions. The Ru-containing species in the anolyte which are anionic or neutral are prevented from crossing the membrane into the catholyte, where they would otherwise be deposited on the cathode as $RuO_2$ and rendered unavailable for further reaction.

At the cathode, hydrogen is produced:

$$2H_2O + 2e^- \rightarrow H_2 + 2OH^- \tag{4}$$

The overall anolyte reaction, taking $C_2Cl_4$ as an example, can be represented as:

$$C_2Cl_4 + 4H_2O \rightarrow 2CO_2 + 8H^+ 4Cl^- + 4e^- \tag{5}$$

The method described in GB 2 226 331 adopts an alkaline anolyte. We have found that it is better to operate in a neutral or slightly acid solution. The effect of alterating pH is to alter the distribution of products at an anode which is oxidising chloride ions to $Cl_2$. In a strongly alkaline solution, the sole product is $OCl^-$ ion, which is satisfactory as it is not volatile and therefore not lost easily from the anolyte. As indicated by reaction (3), $OCl^-$ reacts with Ru(IV) to form the desired $RuO_4$ oxidant. As the pH is reduced, production of $OCl^-$ diminishes in favour of HOCl product, the latter being the sole product at pH6. As pH is further reduced, production of HOCl dimishes in favour of chlorine gas which increases with increasing acidity, approaching a maximum between pH2 and pH0.

Thus, whilst the process works at alkaline pH, carbon dioxide formed is absorbed into the anolyte and we have found the electrochemical efficiency tends to be lower. By operating at a weakly acidic pH $CO_2$ is evolved and this provides a useful indication that the process is working. Also, the electrode potentials for the production of $Cl_2$ and $O_2$ are closer together at acid pH than at alkaline pH. The effect of this is to favour the oxidation of chloride at low pH, which is a desired outcome, and suppress the oxidation of water to oxygen which occurs at high pH, this being an undesired outcome. For operation at a pH lower than 4, there will be evolution of chlorine from the anolyte, but this is accommodated by the use of the scrubber column 42.

We prefer to operate with the anolyte pH in the range pH4 to pH8 and have found best performance if the range is held between pH5.5 and pH6.5. If catholyte is recycled at a rate which keeps the anolyte pH constant, the $Na^+$ required to replace that which crosses the membrane while carrying the cell current is replaced stoichiometrically.

However, additions of the strongly alkaline catholyte recycled stream to the nearly neutral anolyte tend to cause pH excursions, particularly during small-scale runs. It is therefore desirable to incorporate a buffer such as phosphate so that operation is held stable at near neutral pH. Any suitable salt of a weak acid and strong base which is in other respects compatible with the system may be used, although the choice is probably restricted to inorganic buffer systems because of the likelihood of oxidation of weak organic acids in the strongly oxidising anolyte.

Figure 2:
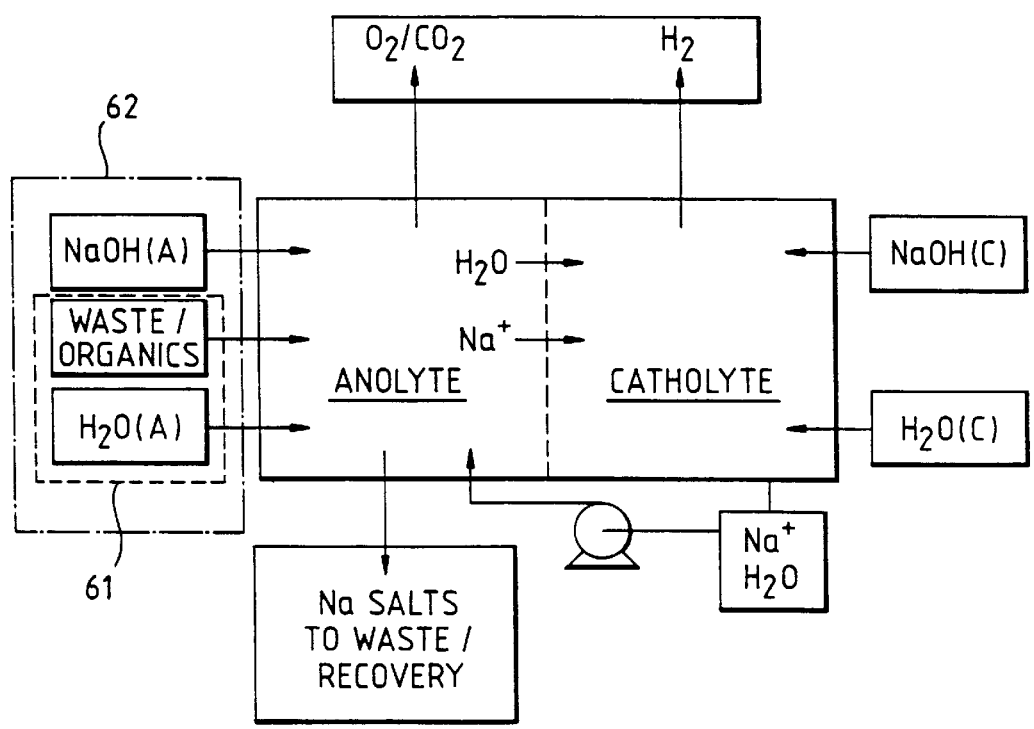
FIG. 2 illustrates diagrammatically some of the chemical flows to and from the electrochemical cell.

During operation of the cell, $Na^+$ and $H_2O$ are transferred from anolyte to catholyte, the water being carried with the sodium ions as $Na^+ \cdot (H_2O)_n$ where n=2–4. As hydrogen is evolved at the cathode, water must be added to the system to make up for the water consumed (the oxygen in the water consumed appears as $CO_2$, CO or $O_2$ from the anolyte). For reasons discussed more fully below, NaOH may also be consumed. FIG. 2 illustrates diagrammatically these flows of $Na^+$ and $H_2O$ around the cell and the variety of ways in which make up can be added where required.

Two possibilities for adding water are denoted as $H_2O$ (A) and $H_2O$ (C) in FIG. 2. These amount respectively to introducing the necessary make up water directly to the anolyte or directly to the catholyte, but in both cases the catholyte is recycled to the anolyte to control the anolyte pH so that this is held at the desired value. Make up water added directly to the anolyte, $H_2O$ (A) may be combined with the feed of organic material to be decomposed, as indicated by the dotted box 61 in FIG. 2. Alternatively, this make up water may be introduced into the catholyte to anolyte recycle stream as shown in FIG. 1. As discussed in relation to FIG. 1, the recycle stream, make up water and waste matter feed may all be combined together.

In addition to the consumption of water, there may also be consumption of NaOH If the material being oxidised contains heteroatoms which produce anionic species on oxidation, as from for example S, Cl, P, As, N, the amount of NaOH transferred from the catholyte has to be increased to prevent the pH falling (excess $H^+$ is produced pro rata to each anionic species). If no additional NaOH is added to the system, the concentration of NaOH in the catholyte would fall continuously. Controlled additions of NaOH can be made either to the anolyte denoted in FIG. 2 as NaOH (A) or to the catholyte denoted as NaOH (C). The former can conveniently be combined with make-up water $H_2O$ (A) and, as a pre-treatment with waste matter as indicated by the chain line box 62 in FIG. 2.

Referring Lo the oxidation of $C_2Cl_4$ shown as an example in reaction (5) above, this is equivalent to the production of four moles of HCl for each mole of $C_2Cl_4$ oxidised and four moles of additional NaOH are required to neutralise this. As indicated in FIG. 2, the additional NaOH can be added to either the anolyte alone or to the catholyte alone, or shared between the two. In each case, the NaOH can be added as solid or in solution in the make-up water, or an appropriate fraction thereof.

The required make-up water could be added to the anolyte and the additional NaOH added to the catholyte recycle stream to increase its concentration. This would serve to produce an even more concentrated NaOH recycle stream (subject to solubility limits) which may have particular usefulness where the catholyte recycle stream is used as a pre-treatment, for example to hydrolyse refractory halogenated organic in the waste material to be oxidised.

As a further alternative, the make-up water and NaOH could be used as a dilute solution to pre-treat the feed of waste matter. This would be advisable, for example, if the feed is aqueous and contains cations which are better removed before they are allowed to enter the anolyte. The cations of Fe, Ca and Mg are best removed in this way to avoid problems which might arise if they enter the anolyte and are transferred to the catholyte, possibly precipitating in the membrane on the way. Conversely, the strongly alkaline catholyte recycle stream could also be used to dissolve metals such as Al which may be associated with the waste matter feed to the system. However, such an approach could not be adopted if the dissolved metal adversely affects the operation of the cell, and the membrane in particular.

Where water is added to the anolyte as part of the feed stream of waste matter, there may be transfer of water from the anolyte to the catholyte by electro osmotic flux which exceeds the overall consumption of water within the system. In this case, excess water in the catholyte has to be removed and this may be achieved by evaporation. It is convenient to employ combustion of the hydrogen produced at the cathode for this purpose to reduce the overall energy consumption.

Whilst FIG. 1 shows all of the catholyte recycle stream to the anolyte flowing through the scrubber 42, a number of advantages result from dividing this stream, so that only a fraction passes through the scrubber. Thus, in the scrubber itself, the reaction of highly concentrated NaOH with $CO_2$ forms $Na_2CO_3$, which is not in itself a problem as the latter forms alkaline solutions which can scrub $Cl_2$. The $CO_2$ would be released again as the solution from the scrubber enters the slightly acidic anolyte, but the presence of $Na_2CO_3$ in the scrubber itself may cause solubility problems.

For this reason, it is better to use only a fraction of the recycled NaOH to feed, as a relatively dilute solution, to the scrubber column 42. There would still be formation of sodium carbonate from the $CO_2$ gas evolving from the anolyte, but the solution would remain alkaline and able to scrub any $Cl_2$ which was escaping from the anolyte as $OCl^-$ and this would thereby return the oxidising value of the $Cl_2$ to the system.

The fraction of the NaOH in the recycled catholyte stream which is fed to the scrubber column 42 will have to be controlled to be such as to remove all the evolving $Cl_2$. Dilution is conveniently achieved with some or all of the make-up water $H_2O$ (A).

With such an arrangement, it is then simpler to use the remaining part of the catholyte recycle stream of highly concentrated NaOH for pre-treatment of the waste feed before oxidation in the anolyte. Apart from the precipitation of unwanted cations noted above, the strong alkali solution may be able to partially hydrolyse, and thereby make more reactive and/or soluble in the anolyte, components of the feed stock which are otherwise rather unreactive. This is mainly relevant for halogenated organic species:

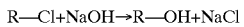

The strong alkali can also be used to solubilise acidic species (carboxylic acids, phenols, etc) as their sodium salts and may have utility for the stripping of acidic species from an immiscible organic phase which is then returned to its origin for re-use. The advantage of this approach is that the alkali is an entirely internal stream within the electrochemical process and is recovered again after the waste matter has been oxidised. In this way, possibly toxic or otherwise troublesome compounds can be removed without generating any additional waste stream for subsequent treatment. Such a process lends itself to integration with solvent washing of an aqueous stream to remove, for example, phenols. The loaded solvent is then stripped using the catholyte recycle stream and the solvent returned for re-use. This approach is an alternative to feeding the entire aqueous waste stream direct to the anolyce, which may not be desirable or practicable in some circumstances because of the composition of the aqueous waste stream.

Heteroatoms (such as N, Cl, P, As, S) present in the waste feed eventually appear as the appropriate sodium salt ($NaNO_3$, $NaCl$, $NaH_2PO_4$, $NaH_2AsO_4$, $Na_2SO_4$) in solution in the anolyte. The extent to which heteroatom anions can be allowed to build up is limited by the solubility of their sodium salts. In principle, these salts can be removed by crystallisation, either on a continuous basis or after a batch treatment in which their concentration is allowed to rise to some limiting value. However, the problem of continuous removal is that the salts separated by crystallisation may be contaminated with organic matter which is supposed to be undergoing oxidation and may also be contaminated with $RuO_2$ which has to be recovered because of its cost.

Related to this problem is the problem of recovery of the ruthenium which has to be secured because of its value. During operation, the Ru is present as both $RuO_4$ and hydrated $RuO_2$, the former being a volatile liquid and the latter a black solid. Some anionic Ru species are also present in the anolyte as minor constituents. In principle, $RuO_2$, being insoluble, can be recovered by known techniques, but this is complicated by two factors. Firstly the presence of precipitated salts in the anolyte and secondly the very finely divided nature of the $RuO_2$ which makes its separation, particularly by filtration, especially difficult.

These separate problems of the removal of heteroatoms and recovery of the ruthenium are neatly solved together in accordance with the invention, making use of the fact that $RuO_4$, is volatile (boiling point 127° C.) and soluble in organic solvents. The anolyte is sparged with air or any suitable carrier gas whilst operation of the electrochemical cell continues in the absence of any feed of waste, organic or presence of any other reducing agent in the anolyte. This will result in electrochemical conversion of all remaining $RuO_2$ to $RuO_4$ which is stripped from the electrolyte in the carrier gas stream. The carrier gas is bubbled through sodium hydroxide which absorbs the ruthenium from the gas in the form of perruthenate, $RuO_4^-$. The perruthenate is readily converted either to reactive $RuO_4$ or to hydrated $RuO_2$, as required. The sodium hydroxide for the absorption may conveniently be derived from the catholyte in the cell.

At this stage, sodium salts of the heteroatoms remaining in the anolyte will have been purged of ruthenium and any remaining organic matter and can be dealt with either as waste or by recovery using crystallisation, for example.

If, during the ruthenium recovery process, the anolyte is allowed to become sufficiently acid, there will be a considerable evolution of chlorine gas which is stripped along with the $RuO_4$ and absorbed into the sodium hydroxide as $OCl^-$ ion. With careful control, it is possible to take an aliquot of strong sodium hydroxide catholyte, absorb in it some chlorine and all of the recovered $RuO_4$ from the spent anolyte, neutralise with HCl and then dilute with water to produce a fresh anolyte ready for the next batch operation with the correct overall balance of [Na], [Cl] and [Ru]. In this, it is immaterial if some of the Cl is present as $OCl^-$.

We have found that operation of the Ru-mediated oxidation in accordance with the above described method has shown unexpected oxidation reactivity towards substances which would not have been expected to react. For example dodecane, a saturated aliphatic hydrocarbon, is successfully decomposed, although it would have been expected that only oxidation to ketones would have been achieved.

A number of factors are believed to contribute to this powerful oxidising performance including:

i. Operating at an elevated temperature of the order of 60–90° C. rather than at ambient.

ii. The anolyte contains a number of different oxidising systems apart from the $RuO_4$ itself, specifically:

| | |
|---|---|
| Ruthenate | $RuO_4^{2-}$ |
| Perruthenate | $RuO_4^-$ |
| Hypochlorite (direct) | $HOCl/OCl^-$ |
| Hypochlorite (indirect) | $HOCl/OCl^- + H_2O \rightarrow O_2$ (via reactive species such as OH which attack the organics). |
| Direct anodic oxidation | Organic + $nH_2O \rightarrow n/2CO_2 + 2nH^+ + 2ne^-$. |
| Anodic water splitting | $H_2O \rightarrow O_2$ (via reactive species such as OH). |

It is assumed that the relative role(s) of these oxidising systems depends upon the precise conditions and the particular organic undergoing oxidation. In the context of destruction of waste matter there is no harm, indeed there is positive benefit, in directing the feed into the anolyte where it is subjected to the combined actions of the oxidising systems listed above.

The method has been applied successfully at the laboratory scale on a variety of substances including (2-chloroethyl) ethyl sulphide (related to the chemical agent sulphur mustard), tributyl phosphate (arguably analagous to nerve agents), dodecane, hexachlorobutadiene (which contains 59% by weight of chlorine), tetrochloroethylene (which contains 85.5% by weight of chlorine), polychlorinated biphenyl (containing approximately 55% by weight of chlorine), pentachiorophenol (containing 67% by weight of chlorine), 2,4-dinitrotoluene and mixed bed and anion exchange resins.

Details of two of these follow as illustrative examples.

Apparatus and procedure

In each of the examples below the apparatus and procedure were as follows:

A flanged glass 'H'-cell was used, with the anolyte and catholyte compartments (about 150 mls each) separated by a Nafion 324 membrane. The cell was held at the desired temperature (50° C.) by immersion in a water bath.

The anolyte compartment was fitted with a flanged lid which carried a condenser, a stirrer gland, a sampling line and a Pt mesh anode, with a surface area of about 18 cm². The cathode compartment was operated without a lid and the cathode consisted of a length of stainless steel tubing.

The anolyte was stirred vigorously using a motor driven stirrer. Gas samples were taken from the space above the anolyte via a PTFE-faced gas chrmatograph septum, using a 1 ml syringe fitted with a fine hypodermic needle. The anolyte offgases were led from the condenser to a displacement flowmeter. A feed of NaOH solution (15M) was pumped from a separate vessel into the anolyte, using a peristaltic pump, in order to hold the anolyte at the desired pH.

The anolyte consisted of 2.5M NaCl solution, containing 0.05M "$RuCl_3.nH_2O$". In addition, to make control of the anolyte pH close to neutrality easier, phosphate buffer was added, 1:1 by volume along with 4M NaCl to give the desired NaCl concentration. The catholyte consisted of NaOH solution, typically 15M.

When the cell was at operating temperature, the current was switched on and the organic substrate added to the anolyte compartment as a single batch. Evolution of $RuO_4$ was allowed to proceed for a few minutes before the organic was added, to provide a visual indication of immediate reaction (colour change from yellow to black). At this stage, the inside surfaces of the anolyte compartment and the lid became coated with hydrated $RuO_2$ and were rendered opaque. Further batches of organic were added as required.

The anolyte was sampled regularly for a pH determination and the NaOH feed was adjusted accordingly to correct any pH changes since the last sample was taken. The anolyte offgas was also sampled and analysed by gas chromatograph/thermal conductivity detector for $CO_2$, CO and $O_2$, using a Hewlett Packard 5890 gas chromatograph fitted with a 2 m×4 mm molecular sieve column. Infrared analysis of the offgas was carried out using 10 cm gas cells fitted with KBr or $CaF_2$ windows and a Perkin Elmer 1710 FTIR spectrophotometer.

The offgas flowrate and composition and the cell current were used to calculate the instantaneous electrochemical efficiency (i.e. fraction of the current flowing which was carrying out useful oxidation).

EXAMPLE I

Oxidation of 2-(chloroethyl)ethyl sulphide (CEES)

The method is of interest for the destruction of chemical munitions which has led to studies of the oxidation of a simulant for sulphur mustard, bix-(2-chlorethyl) sulphide (($ClCH_2CH_2$)$_2$S, 44.7 % Cl). $RuO_4$ is known to oxidise sulphides to the corresponding sulphoxides of sulphones. As a simulant for sulphur mustard, (2-chloroethyl)ethyl sulphide (28.5% Cl) was used as it is much less toxic and also is commercially available. A 3 g portion was added to the anolyte in the 'H'-cell at the beginning of each experiment.

At a cell current of 2 amps, the theoretical rate of oxidation of CEES to $CO_2$ is 0.31 g/hr. At the start of three of the experiments there appeared to be an induction period, during which the efficiency was low and the offgas flow was also low. However, as the runs proceeded, the offgas % $CO_2$ increased to >90%.

It appears likely that the initial oxidation of the organic substrates is the cause of the low offgas flowrate, due to the possible overall anode/anolyte reaction:

(cyclic processes involving $Cl^-/OCl^-$ and Ru(IV)/Ru (VIII) have been omitted).

As $CO_2$ and CO were still being produced at the end of all runs, it is evident that all of the organic had not been oxidised. However, the presence of $CO_2$ and CO proved that many of the reaction pathways operating led to complete oxidation. There remains a possibility that relatively refractory organics such as acetate are also produced.

A 10 ml portion of the anolyte left at the end of one experiment was extracted with 1 ml $CHCl_3$ and subjected to gas chromatograph/mass spectrometer (gc-ms) analysis. The analysis showed that there was a complex mixture of organic species.

A gc-ms run in SIM (selective Ion Monitoring) mode, with the mass spectrometer set to look only at ions with m/e=75 (strongest peak in CEES' EI mass spectrum) showed no detectable CEES. The estimated limit of detection was 10–100 ppb of CEES, so it is apparent that little or no starting material was left when the run was terminated. Both $RuO_4$ and hypochlorite are known to oxidise sulphides to the corresponding sulphone and the length of the run had been more adequate to generate an excess of both oxidants. It was, however, surprising to find an apparent absence of the sulphone in the final mixture of organics.

EXAMPLE II

Oxidation of tetrachloroethylene (TEC)

Tetrachloroethylene oxidation is of interest as this substance is a Red List priority pollutant and also because of its very high chlorine content (86%), which renders it difficult to oxidise by incineration or by Ag(II) mediated electrochemical oxidation.

The apparatus and procedure were the same as described above, but the anolyte temperature was 60° C.

At a cell current of 2 amps, the thoretical oxidation rate for TCE is 3.1 g/hr. The TCE was fed in three batches of 4.3, 4.2 and 4.1 grams and after each addition the % $CO_2$ rose rapidly to 90–95%, indicating very high electrochemical efficiency. Some CO was also produced At the end of the run, the % $CO_2$ had decreased to <10%, indicating that essentially all of the organic fed had been oxidised, and the anolyte changed colour from black to yellow-green, indicating the presence of excess $RuO_4$.

I claim:

1. A method of oxidation of a substance by treatment with a metal oxide or salt the metal thereof being in an initially higher valency state and reduced to a lower valency state during the oxidation reaction, said metal being selected from the group consisting of ruthenium, osmium, irridium and rhodium, which method comprises the steps of:

(i) providing an electrochemical cell having an anolyte, a catholyte and a cation exchange membrane separating the anolyte and catholyte, said anolyte comprising an aqueous solution containing a metal halide and the aforesaid metal oxide or salt, (ii) exposing the said substance to said metal oxide or salt to undergo said oxidation reaction in which said substance is oxidized and said metal oxide or salt is reduced to said lower valency state, (iii) continuously regenerating said metal oxide or salt from its lower to its higher valency state by means of said electrochemical cell, (iv) periodically or at the end of a batch treatment halting said exposing of said substance to said metal oxide or salt in step (ii) above whilst continuing operation of said electrochemical cell until all of said metal from the said group in the cell, which metal is to be recovered and which is in its lower valency state, has been converted into its higher valency state, (v) separating the said metal oxide or salt from the anolyte, and (vi) removing for disposal or recovery by a separation process any heteroatoms including nitrogen, chlorine, phosphorus, arsenic or sulphur which may have accumulated in the anolyte during performance of the method.

2. A method as claimed in claim 1, wherein the said separation process in step (vi) comprises a crystallization or precipitation process.

3. A method as claimed in claim 1, wherein the said metal converted to its higher valency state is separated from the anolyte by volatisation.

4. A method as claimed in claim 1, wherein the metal halide is an alkali metal halide.

5. A method as claimed in claim 4, wherein the metal halide is an alkali metal chloride.

6. A method as claimed in claim 1, wherein the anolyte comprises a weakly acidic solution.

7. A method as claimed in claim 6, wherein the anolyte solution contains an inorganic buffer salt.

8. A method as claimed in claim 1, wherein the catholyte comprises aqueous alkali solution.

9. A method as claimed in claim 1, wherein the said substance for oxidation comprises waste organic material for destruction.

10. A method as claimed in claim 1, wherein tendency for the acidity of the anolyte to rise during operation with corresponding increase in alkalinity of the catholyte is counteracted by a controlled feed of some catholyte into the anolyte.

11. A method as claimed in claim 10, wherein the controlled feed of catholyte into the anolyte is used to scrub chlorine gas evolving from the anolyte.

12. A method as claimed in claim 11, wherein the quantity of the controlled feed of catholyte into the anolyte used for scrubbing is adjusted so as to ensure all evolving chlorine gas is scrubbed out but not all of the evolving carbon dioxide.

13. A method as claimed in claim 10, wherein the said substance for oxidation is introduced into part or all of the said controlled feed of catholyte into the anolyte, whereby the said substance undergoes pretreatment to precipate unwanted cations and/or partial hydrolysation of components of the said substance.

14. A method as claimed in claim 1, wherein the said substance for oxidation is added to the anolyte in the cell, and an electric current passed through the cell.

15. A method as claimed in claim 1, wherein the metal oxide or salt in the higher valency state thereof is withdrawn from the anolyte so as to oxidize the said substance outside the cell, and the reduced metal salt or oxide is recycled to the anolyte in the cell for regeneration to the higher valency state.

* * * * *